(12) United States Patent
Komatsu et al.

(10) Patent No.: US 6,890,436 B2
(45) Date of Patent: May 10, 2005

(54) POROUS HOLLOW FIBER MEMBRANES AND METHOD OF MAKING THE SAME

(75) Inventors: Kensaku Komatsu, Kurashiki (JP); Ichirou Kawata, Okayama (JP); Shigenobu Ishii, Kurashiki (JP); Yoshio Sato, Kurashiki (JP); Seiichi Nakahara, Osaka (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/884,084

(22) Filed: Jun. 20, 2001

(65) Prior Publication Data

US 2002/0011443 A1 Jan. 31, 2002

(30) Foreign Application Priority Data

Jun. 21, 2000 (JP) ........................................ 2000-186034
Jun. 26, 2000 (JP) ........................................ 2000-190739

(51) Int. Cl.[7] ............................................ B01D 39/14
(52) U.S. Cl. ............................ 210/500.41; 210/500.42; 210/500.23; 210/500.27; 264/41; 264/45.8; 264/45.9
(58) Field of Search ........................ 210/500.23, 500.27, 210/500.41, 500.42

(56) References Cited

U.S. PATENT DOCUMENTS

| 4,229,297 A | | 10/1980 | Nohmi et al. |
| 5,019,261 A | * | 5/1991 | Stengard |
| 5,258,149 A | * | 11/1993 | Parham et al. ................. 264/41 |
| 5,328,613 A | | 7/1994 | Beall et al. |
| 5,340,480 A | * | 8/1994 | Kawata et al. |
| 5,746,916 A | | 5/1998 | Kamo et al. |
| 5,789,081 A | | 8/1998 | Komatsu et al. |
| 5,976,433 A | * | 11/1999 | Komatsu et al. |
| 5,993,661 A | * | 11/1999 | Ruckenstein et al. |
| 6,045,694 A | * | 4/2000 | Wang et al. |

FOREIGN PATENT DOCUMENTS

| EP | 0 548 492 | 6/1993 |
| JP | 10-121759 | 5/1998 |

OTHER PUBLICATIONS

Derwent Abstracts—JP 58091822/pn with partial English Translation of Examples 1, 2 and 4 in JP–58–91822.
English Translation of Examples 1, 2 and 4 in JP–58–91822.

* cited by examiner

Primary Examiner—Ana Fortuna
(74) Attorney, Agent, or Firm—Oblon, Spivak, McClelland, Maier & Neustadt, P.C.

(57) ABSTRACT

A porous hollow fiber membrane having a particle cutoff within the range of 1 to 10 μm and a pure water permeate flow equal to or higher than 30,000 $L/m^2/hr/100$ kPa. This porous hollow fiber membrane can be prepared by a method including, while a spinning dope containing a base polymer as a material for forming the porous hollow fiber membrane, an additive used for facilitating a phase separation of the spinning dope, a solvent compatible with both the base polymer and the additive and a mass of microparticles insoluble to the compatible solvent and uniformly dispersed in a liquid medium and having an average particle size within the range of 1 to 20 μm, and a coagulating liquid for forming the hollow fiber membrane is used, a step of forming the hollow fiber membrane according to a dry-wet spinning method or a wet spinning method, and a step of extracting and removing the microparticles by immersing the hollow fiber membrane, which has been spun, into an extracting solution effective to dissolve the microparticles, but ineffective to dissolve the base polymer.

32 Claims, 5 Drawing Sheets

POROUS HOLLOW FIBER MEMBRANES AND METHOD OF MAKING THE SAME

BACKGROUND OF THE INVENTION

1. Field of the Invention

The present invention relates to porous hollow fiber membranes for use in filtration of untreated water and a method of making such porous hollow fiber membranes.

2. Description of the Prior Art

In recent years, a filtering technique utilizing filtering membranes having a permselectivity has made a remarkable progress. Those filtering membranes are currently utilized in practice in numerous applications including, for example, production of ultrapure water, preparation of medicines, sterilization and finalization of brewages and purification of drinking water. The use of the filtering membranes has widely circulated to meet with the requirement to refine water (a high degree treatment), improvement in sanitation and improvement in precision. Of the various filtering membranes, the hollow fiber membrane has a feature in that the space for installation per unitary membrane area can be reduced. However, in terms of the system of filtering operation, sand filtration is still the mainstream. For example, an overwhelming majority of service water supply plants make use of a combination of a flocculating pool and a sand filtering pool.

On the other hand, as far as the application of the filtering technique in service water supply is concerned, subsequent to the mass crisis of Cryptosporidium syndromes that broke in 1996 in a town in Saitama Prefecture, Japan, the issue of "distasteful service water" resulting from degradation of the quality of headwater brought about pressing demands for improvement in sanitation and quality of the service water in metropolis. The existing waterworks facilities equipped with the flocculating pool in combination with a sand filtering pool have now come to be unreliable in terms of sanitation.

In contrast thereto, with a filtering technique using the separation membrane, it is possible to separate a substance to be filtered with a precision that a particle cutoff is only 1/100 of that exhibited by a sand filtering and, therefore, the filtering technique using the separation membrane is highly reliable. For this reason, mainly in a small water supply system, it is a recent trend to shift from the use of the standard sand filtering equipment to the use of a membrane filtering equipment and, as a new water purifying system, the use of the membrane filtering technique is currently wide-spreading.

In the course thereof, a reason that the system in which the separation membrane is used has not yet been wide-spreading in the field of the service water supply system is because, while with the sand filtering system a flow at which the water is filtered per unitary filtering area is considerably high (for example, 3 to 10 $m^3/m^2/d$ at a slow filtration or 120 to 1,500 $m^3/m^2/d$ at a rapid filtration), resulting in low cost to purify an untreated water, in the case of the standard membrane filtration although having high ability of purifying the untreated water as compared with the sand filtration, a permeate flow is extremely low (for example, 0.5 to 2 $m^3/m^2/d$), resulting in high cost required to provide a purified water.

In the meantime, the separation membrane has the following advantages as compared with the sand filtration and, therefore, if the problem associated with the high cost required to prepare the purified water due to the low permeating speed were to be successfully removed, the separation membrane appears to wide-spread as a new technique capable of superseding the sand filtration.

a. Since the permselectivity is sharp, a stable filtered liquid can be obtained without being affected by the quality of an untreated water and a safety factor is also high.

b. Complicated maintenance such as replacement of a mass of sand is little involved and the amount of materials to be disposed is minimal.

c. While the sand filtration requires coagulating and sedimenting equipments in order to improve the permselectivity, the coagulating and sedimenting equipments to be used in association with the membrane filtration can be dispensed with or may be simplified, thus making it possible to minimize the space for the system and also to simplify the processing steps.

d. Since the filtrate recovery rate is high and the drainage of the backwashing water is minimal, disposal of the backwashing water used can be simplified.

As discussed above, the reason that the permeate flow exhibited by the membrane filtration is considerably lower than that exhibited by the sand filtration appears to be because with the conventional separation membrane which is mainly used in the form of an ultrafiltration membrane or a microfiltration membrane having the particle cutoff not greater than 0.2 $\mu$m, a pure water permeate flow is originally low because of the small particle cutoff and because impurities and suspended matter contained in the untreated water are trapped almost by the separation membrane with the consequence that the pure water permeate flow is further lowered in the face of the resistance imposed by the impurities and others. In contrast thereto, the fractionating precision of the sand filtration is within the range of about 5 to 10 $\mu$m, the pure water permeate flow is originally high, and even in the presence of the impurities and suspended matter in the untreated water, they can be penetrated if the size thereof is not greater than 5 $\mu$m. Therefore, the sand filtration is less sensitive to the resistance imposed by the impurities and others and, therefore, can maintain a high permeate flow.

Although with the sand filtration impurities and others of which size is not greater than 5 $\mu$m cannot be trapped, in most of the applications the currently utilized purifying equipment in which the coagulating and sedimenting facilities and the sand filtration are utilized in combination would work satisfactorily in terms of the quality of water if the particle cutoff is within the range of about 5 to 10 $\mu$m, and it appears that the quality of water achieved by the microfiltration or the ultrafiltration region may not be necessary. Also, in applications other than the service water, the sand filtration is effective to satisfy a requirement sufficiently in terms of the quality of water and it is suspected that there are some applications in which the quality of water achieved by the microfiltration or the ultrafiltration region may not be necessary.

Of the applications other than the service water, where water for a swimming pool, public baths, spa, an aquarium, tanks for aquatic animals, a coolant used in plants, boilers, ponds and so on is desired to be purified, a circulation purification process is generally used in which portion of the impounded water is taken and, after the taken water has been subjected to a physical separating operation or a biological oxidizing treatment such as, for example, sand filtration, filtration with a filter aid, coagulation and sedimentation or pressurized floatation, the treated water is returned to the impounded water.

In recent years, the quality of industrial water and groundwater is getting worse as a result of pollution of the water source and, in view of this, it is increasingly recognized to recycle the water and to increase the safety factor. Accordingly, with the conventional physical separating technique such as, for example, the sand filtration, filtration with a filter aid, coagulation and sedimentation or pressurized floatation it often occur that the required purification level of the impounded water cannot be attained. Also, the sand filtration, the coagulation and sedimentation or the pressurized floatation has a problem in that the separation precision is not smaller than 10 μm and no suspended microparticles of a size greater than it is difficult to remove. Although the filtration with a filter aid is a process in which a pre-coating layer of the filter aid such as diatomite is formed on a filtering surface such as a filtering cloth and filtration is effected through this pre-coating layer, complicated procedures are required to introduce the filter aid into the pre-coating layer and the untreated water and to replace the filter aid and, moreover, the filter aid itself constitutes a waste to be disposed. Accordingly, the filtration with the filter aid has a problem in that disposal of the filter aid would eventually lead to environmental pollution. On the other hand, if attempt is made to purify the impounded water using a biological oxidizing process, a relatively long time is required to purify, the untreated water and a relatively large space for installation is required to compensate for it. There are other problems such as complicated maintenance, management and requirement of an apparatus for removing suspended matter after the treatment.

In the meantime, a technique in which in place of the conventional sand filtration and the filtration with the filter aid, hollow fiber membranes are used to purify the impounded water such as water for a swimming pool is well known in the art from, for example, the Japanese Laid-open Patent Publications No. 59-206091, No. 8-323396 and No. 10-121759.

The Japanese Laid-open Patent Publication No. 59-206091 discloses purification of the impounded water (pool water) with the use of hollow fiber membranes for ultrafiltration region. If the standard hollow fiber membranes having such a small separating precision are used, removal of suspended microparticles, bacteria and so on can be achieved sufficiently and a stable and high quality water can be obtained. However, according to the technique disclosed in this Japanese Laid-open Patent Publication No. 59-206091, since the filtering speed is so low that treatment of a large quantity of impounded water such as water for a swimming pool requires the use of an equipment having a large membrane area and, therefore, this known technique is impractical because of the cost incurred in preparing the equipment and the high running cost.

On the other hand, the Japanese Laid-open Patent Publications No. 8-323396 and No. 10-121759 disclose a method in which a major quantity of the impounded water is filtered by circulation through a coarse filtration such as sand filtration and only a portion thereof is purified by the use of hollow fiber membranes. However, with this method, if the proportion of the amount of filtration through the hollow fiber membranes relative to the entire amount of the impounded water is low, the water quality cannot be improved and, conversely, if the proportion of the amount of filtration through the hollow fiber membranes relative to the entire amount of the impounded water is increased, the water quality may be improved, but a problem associated with the increased cost for the equipments would occur and, therefore, no satisfactory result cannot be necessarily obtained.

SUMMARY OF THE INVENTION

Accordingly, the present invention has been devised in view of the problems and inconveniences discussed hereinabove and is intended to provide a porous hollow fiber membrane and a method of making the same, in which the filtering performance is excellent, the cost for preparing water is low, application to the use where the sand filtration or the like has been employed in view of the cost can easily be achieved, and the excellent quality of water that is superior to that obtained by the sand filtration in terms of the water quality and the safety factor can be prepared consistently and stably, although not for intended for use in dezymotization such as achieved with the standard hollow fiber membranes.

The porous hollow fiber membrane of the present invention that is effective to resolve the foregoing problems is characterized by having a particle cutoff within the range of 1 to 10 μm and, preferably, within the range of 2 to 5 μm and the pure water permeate flow equal to or higher than 30,000 L/m$^2$/hr/100 kPa and, preferably, 100,000 L/m$^2$/hr/100 kPa. The term "particle cutoff" referred hereinbefore and hereinafter is intended to means the particle size (S) of particles with which the hollow fiber membrane can exhibit a blocking rate of 90%. This particle cutoff can be determined by measuring the blocking rates of two kinds of particles having different particle sizes and determining the value S at which in the following approximate equation (1) the parameter R (i.e., the blocking rate) can attain 90.

$$R=100/(1-m \cdot \exp(-a \cdot \log(s))) \quad (1)$$

Wherein a and m represents a constant determined by the hollow fiber membrane and are calculated based on two or more measured values of the blocking rates.

Also, the pure water permeate flow is measured in the following manner. Specifically, using a single-open ended hollow fiber membrane module having an effective length of 3 cm, and using pure water as untreated water, the amount of the pure water permeated per unitary time when filtered (extra-pressurized filtration) from outside to inside of the hollow fiber membranes under a filtering pressure of 50 kPa at a temperature of 25° C. is measured. A numerical value converted into the amount of pure water permeated per unitary membrane area, unitary time and unitary pressure represents the pure water permeate flow.

With this structure, by using the porous hollow fiber membranes having a particle cutoff within the range of 1 to 10 μm and the pure water permeate flow equal to or higher than 30,000 L/m$^2$/hr/100 kPa, any possible reduction in flow rate resulting from clogging can be suppressed markedly and a high filtering flow can be attained and maintained.

Such porous hollow fiber membranes can be manufactured by a method characterized by comprising, while a spinning dope containing a base polymer as a material for forming the porous hollow fiber membrane, an additive used for facilitating a phase separation of the spinning dope, a solvent compatible with both the base polymer and the additive and a mass of microparticles insoluble to the compatible solvent and uniformly dispersed in a liquid medium and having an average particle size within the range of 1 to 20 μm, and a coagulating liquid for forming the hollow fiber membrane is used, a step of forming the hollow fiber membrane according to a dry-wet spinning method or a wet spinning method; and a step of extracting and removing the microparticles by immersing the hollow fiber membrane, which has been spun, into an extracting solution effective to dissolve the microparticles, but ineffective to dissolve the base polymer. The spinning dope referred to above is preferably employed in the form of a uniform spinning dope of a composition in which when only the base polymer, the additive and the solvent compatible to both the base polymer and the additive are dissolved, phase separation takes place, but addition of the microparticles suppresses the phase separation to enable spinning of the hollow fiber membrane.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
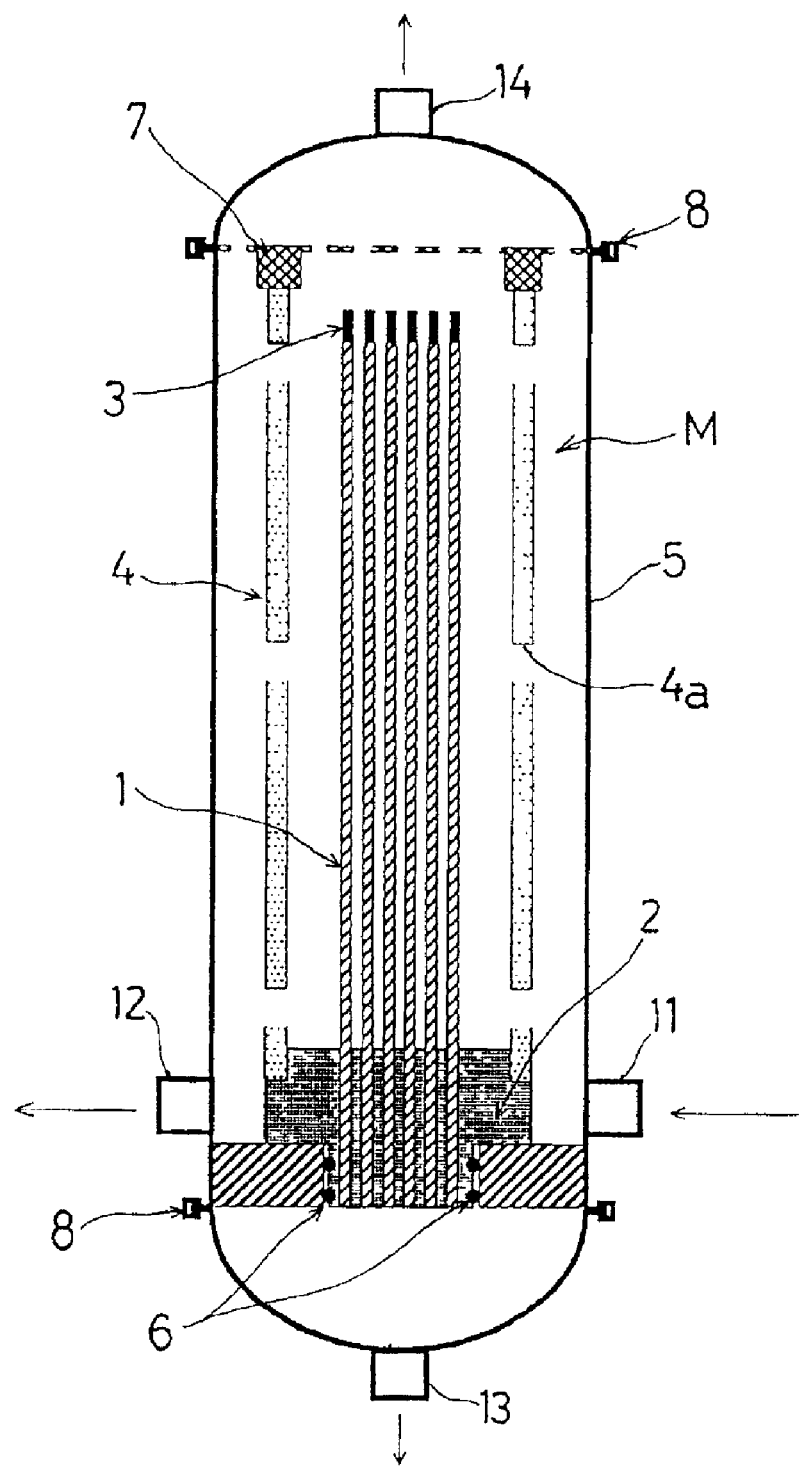
FIG. 1 is a schematic longitudinal sectional view showing one example of a hollow fiber membrane module utilizing a plurality of hollow fiber membranes according to the present invention.

Hereinafter, preferred embodiments of the present invention will be described with reference to the accompanying drawings.

Material for a porous hollow fiber membrane of the present invention is not specifically limited to a particular material and any of cellulose polymers, polyacrylonitrile polymers, polyimide polymers, polyamide polymers, polysulfone polymers, polyvinylalcohol polymers, polyvinylchloride polymers, fluorine polyethylene polymers, and their denatured polymers and a mixture thereof can be conveniently used as a material for the porous hollow fiber membrane of the present invention. Of those materials, polysulfone polymers is preferred since the use thereof results in the porous hollow fiber membrane having a high heat resistance, a high resistance to acid and alkaline, a high physical property and a high resistance to the oxidizing agent. Examples of the polysulfone polymers include those having a repeating unit which are expressed by the following chemical formula (I) or (II):

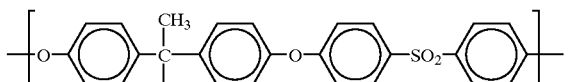

(I)

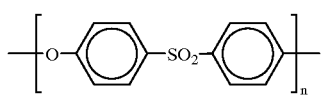

(II)

A base material for the hollow fiber membrane of the present invention may contain a hydrophilic polymer in order to impart a functionality such as a wettability with water and a resistance to contamination to the resultant hollow fiber membrane. Examples of the hydrophilic polymer include polyvinylalcohol, a copolymer of ethylene and vinyl alcohol, a copolymer of ethylene and vinylacetate, polyvinylpyrrolidone, polyethyleneoxide, polyvinylacetate, polyacrylic acid and a denatured polymer thereof Of those hydrophilic polymers, polyvinylalcohol containing a relatively large variety of denatured components is preferred since the functionality appropriate to the intended purpose can easily be imparted to the hollow fiber membrane. In order for the functionality to be effectively imparted to the hollow fiber membrane without properties of the base polymer being adversely affected, the content of the hydrophilic polymer is preferably chosen to be within the range of 1 to 10 wt %. In particular, it is preferred that the base polymer which is polysulfone polymers is added with 1 to 10 wt % of the hydrophilic polymer (particularly, polyvinylalcohol polymers). Where the hydrophilic polymer is added to the base polymer in order to impart the functionality such as, for example, the wettability to water, the hydrophilic polymer may be added to the spinning dope.

The filtering membrane is available in the form of a sheet membrane, a tubular membrane and a hollow fiber membrane. The hollow fiber membrane is known to have a feature in that the space for installation per unitary membrane area can be reduced and is therefore advantageously used particularly where a relatively large quantity of water is desired to be treated. The porous hollow fiber membrane of the present invention has an inner diameter generally within the range of 0.2 to 2 mm and an outer diameter generally within the range of 0.4 to 5 mm.

A method of making the porous hollow fiber membrane according to the present invention will now be described. The method which will now be described is generally similar to that disclosed in the Japanese Laid-open Patent Publication No. 7-163849, published in 1995 and owned by the assignee of the present invention, but differs therefrom in that the composition of the spinning dope has been modified and improved for the purpose of the present invention. The porous hollow fiber membrane making method of the present invention makes use of the spinning dope containing a base polymer which is a raw material for the porous hollow fiber membrane, additives, a solvent compatible with them and a mass of microparticles insoluble in the solvent and uniformly dispersed in the solvent and having an average particle size within the range of 1 to 20 μm, in combination with a coagulating liquid for forming the hollow fiber membrane. This porous hollow fiber membrane making method of the present invention includes a step of forming a hollow fiber membrane by the use of the dry-wet spinning technique or a wet spinning technique and a step of immersing the spun hollow fiber membrane into an extracted liquid of a kind capable of dissolving the microparticles and incapable of dissolving the base polymer, so that the microparticles can be removed by extraction.

The concentration of the base polymer is so chosen that not only can a sufficient strength required by the hollow fiber membrane be attained, but a through hole can also be effectively and efficiently formed in the hollow fiber membrane. Although the concentration of the base polymer varies depending on the specific composition of the base polymer, it is generally chosen to be within the range of 5 to 40 wt % and preferably within the range of 15 to 25 wt %.

Addition of one or more additives is effective to enhance a phase separation of the spinning dope, which eventually results in formation of the hollow fiber membrane having a relatively large pore size. The additive may be either in a liquid phase or in a solid phase and includes, for example, water, one or more glycols such as ethylene glycol, propylene glycol and polyethylene glycol, one or more esters such as methyl acetate and ethyl acetate, one or more alcohols such as ethanol, propanol and glycerin, one or more diols such as butanediol, one or more inorganic salts such as lithium chloride and magnesium sulfate, and a mixture thereof Although the amount of the additive to be used varies depending on a specific composition of the additive used, the amount thereof should be so chosen that even though the phase separation occurs when only the solvent compatible to both the base polymer and the additive is dissolved, mixture of the microparticles with the solvent suppresses the phase separation to provide the homogeneous spinning dope effective to facilitate spinning.

Any kind of solvent can be employed in the practice of the present invention, provided that the solvent used is effective to dissolve in both the base polymer and the additive. Examples of the solvent compatible to both the base polymer and the additive include, for example, N, N-dimethylformamide, N, N-dimethylacetamide, N-methylpyrrolidone, N-vinylpyrrolidone, dimethylsulfoxide and dymethylsulforane.

The microparticles insoluble in the compatible solvent includes, for example, metal oxides such as silicon oxide, zinc oxide and aluminum oxide, metallic microparticles such as silicon, zinc, copper, iron and aluminum, and inorganic compounds such as sodium chloride, sodium acetate, sodium phosphate, calcium carbonate, and calcium hydroxide. The amount and the specific composition of the microparticles to be used in the practice of the present invention may be chosen suitably depending on the specific composition of each of the base polymer and the additive. The microparticles are preferably of a kind having a high intermolecular force that can be exhibited among the microparticles within the solution and also having a propensity of coagulating. Accordingly, of the microparticles, microparticles of silicon oxide, i.e., a silica powder is most preferred because they have a relatively small average particle size, because the silicon oxide microparticles of varying particle sizes are readily available in the market, because they can easily be dispersed in the spinning dope, and because they have a propensity of being coagulated. The average particle size of the microparticles is preferably within the range of 1 to 20 $\mu$m and more preferably within the range of 2 to 10 $\mu$m. If the average particle size of the microparticles is smaller than 1 $\mu$m, the hollow fiber membrane having a large particle cutoff will hardly be obtained. On the other hand, where the microparticles having an average particle size exceeding 5 $\mu$m are used, the greater the average particle size is, the lower the capability of coagulating is together, resulting in a tendency to form the heterogeneous hollow fiber membrane containing relatively large voids. For this reason, it is necessary to suitably mix particles of a relatively small average particle sizes and/or to increase the amount of the additive to be used so that the coagulating action of the microparticles can be enhanced. It is to be noted that the term "insoluble" used hereinabove and hereinafter in connection with the microparticles is intended to means that the solubility exhibited at a temperature at which the spinning dope dissolves is not greater than 0.1 g (microparticles)/100 cc (solvent).

The spinning dope of the composition described above is, generally after having been degassed, discharged through a nozzle of a double ring structure and is subsequently immersed in a coagulating bath to form the hollow fiber membrane. As far as the hollow fiber membrane making method is concerned, either the dry-wet spinning method in which the spinning dope discharged through the nozzle is once passed a predetermined length through air and is then introduced into the coagulating bath, or a wet spinning method in which the spinning dope discharged through the nozzle is introduced direct into the coagulating bath may be employed. However, the use of the dry-wet spinning method is advantageously practiced because an outer surface structure of the resultant hollow fiber membrane can easily be controlled and, also, because the hollow fiber membrane having higher water permeability can be manufactured.

When the hollow fiber membrane is to be spun, the coagulating liquid is generally introduced inside the nozzle of the double ring structure for the purpose of shaping the spinning dope, discharged from the nozzle, into a fibrous hollow shape. By controlling a coagulating speed of the coagulated liquid, it is possible to control the inner surface structure of the hollow fiber membrane. Provided that the coagulating liquid is compatible with the solvent for the spinning dope and has a capability of coagulating the base polymer, the coagulating liquid of any suitable composition can be used and may be employed in the form of, for example, a liquid at least one selected from a group consist of water, alcohol glycol, and ester or a mixture of the solvent (compatible to both the base polymer and the additive) and the liquid described hereinabove. Addition of a water-soluble, hydrophilic polymer such as, for example, polyvinylalcohol or polyvinylpyrrolidone to the coagulating liquid is effective to coat the hydrophilic polymer to the inner surface of the hollow fiber membrane or the hollow fiber membrane in its entirety by means of diffusion during the coagulating stage. A coagulating solution to be used may be of a composition similar to that of the coagulating liquid.

With the dry-wet spinning method, the outer surface structure of the eventually resultant hollow fiber membrane is determined by the length of a dry zone, temperature, humidity and other factors. If the length of the dry zone is great or if the temperature or humidity of the dry zone is increased, the phase separation will be accelerated and, therefore, the pore size of micropores formed in the outer surface tends to increase. Even though the dry zone has a small length, for example, 0.1 cm, the hollow fiber membrane having an outer surface structure quite different from that resulting from the use of the wet spinning method in which no dry zone is used can be obtained. It is, however, to be noted that if the dry zone is too long, the spinning stability will be adversely affected and, therefore, the dry zone should be of a length generally within the range of 0.1 to 200 cm and preferably within the range of 0.1 to 50 cm.

The hollow fiber membrane which has been coagulated in the coagulating bath contains the compatible solvent, the additive and a large quantity of the microparticles. These contents are removed by the following manner during the spinning process or once it has been wound up. In the first place, the compatible solvent and the additive remaining in the hollow fiber membrane are extracted by rinsing with cold water or with hot water of 40 to 90° C. Where the hydrophilic polymer is desired to be left in the hollow fiber membrane, after the above described rinsing, the hydrophilic polymer has to be cross-linked by heat, light or radiator. A method of achieving this cross-linking may be chosen from a variety of methods known in the art depending on the particular composition of the hydrophilic polymer. By way of example, where the hydrophilic polymer is polyvinyl alcohol, a method of converting the hydrophilic polymer into an acetal by the use of an aldehyde such as glutaraldehyde in the presence of a sulfuric acid catalyst can be conveniently employed.

Thereafter, using an extracting solvent effective to dissolve the microparticles, but not the base polymer of the hollow fiber membrane, the microparticles are extracted. As the microparticles are removed by extraction in this manner, micropores are left in the hollow fiber membrane. The condition under which the micropores are extracted should be carefully set up such that 95% or more of the microparticles, preferably 100% thereof, can be extracted. Since the microparticles are contained in a matrix of polysulfone, requirements for the dissolving condition are generally severer than that applicable where only the microparticles are dissolved, although subject to change depending on the particular composition of the microparticles and the solubility of the extracting solvent, and the extracting temperature and the solvent concentration have to be relatively high with a longer time required to accomplish the extraction. By way of example, where microparticles of silicon oxide are to be extracted, the hollow fiber membrane should be treated under the condition in which the extracting solvent is an aqueous solution of sodium hydroxide that is within the range of 5 to 20 wt %, of a temperature equal to or higher than 60° C. and the length of extracting time is 30 or more minutes. It is to be noted that removal by extraction of the microparticles may be carried out during the spinning step or after the hollow fiber membranes are assembled into a module.

The porous hollow fiber membrane of the present invention has a hollow representing a microporous structure such as, for example, a mesh structure, a honeycomb structure or a microinterstice structure. The hollow of the hollow fiber membrane may have a finger-like structure or a void structure. The microporous structure in the hollow of the hollow fiber membrane is determinative of the particle cutoff and the pure water permeate flow.

The porous hollow fiber membrane manufactured in the manner described above is dried after having been would around, for example, a frame or a shackle. After the drying, lengths of the porous hollow fiber membrane are bundled together to provide a porous hollow fiber membrane bundle which is in turn accommodated in a casing of a predetermined shape with their ends fixed by the use of, for example, an urethane resin or epoxy resin to thereby complete a hollow fiber membrane module. The hollow fiber membrane module is well known in the art and is available in various designs, for example, a design in which opposite ends of the lengths of the bundled porous hollow fiber membranes are fixed together while having been left open and a design in which the lengths of the bundled porous hollow fiber membranes are fixed at one end thereof while having been sealed and are left loose at the opposite end. The hollow fiber membrane module is mounted on a filtering apparatus for purification of water, separation or refinement of a liquid medium.

One example of the hollow fiber membrane module discussed above will now be described in detail with particular reference to FIG. 1. The illustrated hollow fiber membrane module M accommodates therein a bundle of porous hollow fiber membranes each having the particle cutoff within the range of 1 to 10 $\mu$m and the pure water permeate flow equal to or larger than 30,000 L/m$^2$/hr/100 kPa. The longer the bundled porous hollow fiber membranes 1, the higher a loss of pressure induced during flow of a liquid medium through the bundled porous hollow fiber membranes 1, and therefore, the bundled porous hollow fiber membranes 1 accommodated within the hollow fiber membrane module M preferably have a relatively short length. In general, the length of the bundled porous hollow fiber membranes 1 is preferably not greater than 50 cm and, more preferably not greater than 40 cm. Since the bundled porous hollow fiber membranes 1 of the present invention exhibits an extremely higher than that exhibited by the standard porous hollow fiber membranes, the bundled porous hollow fiber membranes of the present invention can have a reduced length in order for a required amount of the liquid medium to be filtered and, hence, the hollow fiber membrane module M can be assembled compact in size.

The hollow fiber membrane module M shown in FIG. 1 is of a design in which the bundled porous hollow fiber membranes 1 are, while being left open, fixedly jointed at one end thereof together by means of a bonding resin block 2. A bonding agent eventually forming the bonding resin block 2 that holds the open ends of the bundled porous hollow fiber membranes 1 may be, for example, an epoxy resin, an urethane resin or a fluorinated resin, but may not be limited thereto. Other ends of the bundled porous hollow fiber membranes 1 remote from the bonding resin block 2 are sealed at a fiber end sealing region 3 by the use of a bonding material which may be the same as the bonding agent used to form the bonding resin block 2. While the sealed ends of the bundled porous hollow fiber membranes 1 are preferably left loose, that is, separate from each other, they may be divided into a plurality of blocks, each block of those ends thereof sealed.

In order to protect the bundled porous hollow fiber membranes 1 and also to increase the handling thereof, the bundled porous hollow fiber membranes 1 are housed within an inner casing 4 of the hollow fiber membrane module M that has a plurality of perforations 4a defined therein. The bonding resin block 2 and the module inner casing 4 may be permanently connected together by the use of a resin or the like or, alternatively, the module inner casing 4 may be detachably connected with the bonding resin block 2 by the use of screws or the like. The module inner casing 4 is used as accommodated within a module housing 5. The module inner casing 4 and the module housing 5 are connected together by means of a plurality of O-rings 6 such as shown in FIG. 1, or where the both are threadingly engaged with each other, they may be connected together by means of one or more gaskets. The other end of the module inner casing 4 remote from the bonding resin block 2 is retained in position by a retainer 7 within the module housing 5. Preferably, the module housing 5 is of a design in which the hollow fiber membrane module M can be completely removably mounted within the module housing 5. By way of example, an untreated water inlet port 11 and a drainage port 12 for draining are defined and positioned below the hollow fiber membrane module M, a filtered water discharge port 13 is defined and positioned at a bottom of the hollow fiber membrane module M, and a vent port 14 for venting a gaseous medium such as, for example, air during backwashing is defined and positioned above the hollow fiber membrane module M. In the illustrated example, in order to facilitate separation of a structure having an air venting function relative to a structure having the filtered water discharge port 13, the both are jointed together by means of a V-band 8. However, in place of the V-band 8, the both may be fixed together by a flanged connection or ferrule. Where the design is employed in which the various component parts can be dismantled or disassembled, disposal of the used hollow fiber membrane module M can be facilitated by separating the used hollow fiber membrane module M into the module inner casing 4, the bonding resin block 2, the bundled hollow fiber membranes 1 and so on according to the class of industrial wastes so that some or all of the component parts of the hollow fiber membrane module M can be recycled or reused with the environmental pollution consequently minimized.

As shown in FIG. 1, the hollow fiber membrane module M preferably has the bonding resin block 2 positioned below and the fiber end sealing region 3 positioned above. In other words, an untreated water introduced into the hollow fiber membrane module M through the untreated water inlet port 11 is, as it flows from the outside to the inside of each of the bundled porous hollow fiber membranes 1, filtered and is subsequently discharged through the filtered water outlet port 13 by way of the bonding resin block 2. For backwashing, a gas backwashing method is preferably employed in which a gaseous medium such as, for example, air is introduced into an untreated water side through a filtrate side so as to penetrate through the pores of the porous hollow fiber membranes 1. In the illustrated embodiment shown in FIG. 1, since the fiber end sealing region 3 is positioned on an upper side to facilitate discharge of separated suspension particles together with the gaseous medium during the gas backwashing, there is an advantage in that the effect of the backwashing can increase. It is to be noted depending on the backwashing method, the hollow fiber membrane module M may be arranged so that the bonding resin block 2 and the fiber end sealing region 3 may be positioned upwardly and downwardly, respectively.

An example of methods of making a purified water with the use of the porous hollow fiber membranes includes a step of filtering untreated water with the hollow fiber membranes each having the particle cutoff within the range of 1 to 10 $\mu$m, which step may be one of the following steps A to F. The untreated water such as river water, lake water or groundwater contains impurities such as, for example, protozoa such as cryptosporidium and giardia, microorganisms, algae, inorganic particulates such as sands and/or metallic oxides such as ferric oxide in a varying amount that depends on the specific composition. In consideration of the requirements of the water quality level, target matter desired to be removed, and costs which would be incurred in connection with instruments and equipment, one of the following steps A to F can be suitably chosen to remove the specific impurities to provide the purified water suitable for the use of drinking, industrial, material or coolant.

A. The untreated water originating from the water source is filtered directly through the hollow fiber membranes each having the particle cutoff within the range of 1 to 10 $\mu$m.
B. The untreated water from the water source is, after having been coagulated with the use of a coagulating agent, filtered through the hollow fiber membranes each having the particle cutoff within the range of 1 to 10 $\mu$m.
C. After the untreated water from the water source has been coagulated by the use of a coagulating agent, followed by sedimentation or floatation under pressure to separate suspended particles, the treated water is filtered through the hollow fiber membranes each having the particle cutoff within the range of 1 to 10 $\mu$m.
D. After the untreated water from the water source has been coagulated by the use of a coagulating agent, followed by sedimentation or floatation under pressure to separate suspended particles, the treated water is first filtered through a sand filter, followed by filtration through the hollow fiber membranes each having the particle cutoff within the range of 1 to 10 $\mu$m.
E. The untreated water from the water source is first filtered through a sand filter, followed by filtration through the hollow fiber membranes each having the particle cutoff within the range of 1 to 10 $\mu$m.
F. The untreated water from the water source is, after having been coagulated by the use of a coagulating agent, filtered through a sand filter and is then again filtered through the hollow fiber membranes each having the particle cutoff within the range of 1 to 10 $\mu$m.

In the practice of the above described filtering method, as shown in FIG. 1, the hollow fiber membrane module having a bundle of porous hollow fiber membranes prepared in accordance with the present invention is utilized. It is to be noted that the particle cutoff thereof may be suitably selected depending on the purpose and the application for which the untreated water is filtered. By way of example, where protozoa cryptosporidium and giardia contained in the drinking water are desired to be removed by filtration, the use of the hollow fiber membranes each having the particle cutoff within the range of 2 to 3 $\mu$m is recommended since the protozoa generally have a particle size within the range of 4 to 5 $\mu$m. Also, where suspended microparticles of a particle size equal to or greater than 5 $\mu$m are desired to be removed by filtration, the use of the hollow fiber membranes each having the particle cutoff within the range of 4 to 5 $\mu$m is recommended. Selection of the hollow fiber membranes each having the particle cutoff that is as near to the particle size of material desired to be removed by filtration as possible is effective to secure a high filtering speed.

If filtering with the use of the hollow fiber membranes continues for a long time, the filtering speed will be lowered due to clogging. In the case of the sand filter, supply of a large amount of backwashing water in a direction counter to that of flow of water during filtration is generally practiced to separate suspended particles, deposited in a mass of sand, to thereby refresh the sand filter. Even in the case of the hollow fiber membranes, a similar procedure by backwashing is required at intervals of a predetermined time, but the amount of water used for backwashing is much smaller in the case of the hollow fiber membranes than that in the case of the sand filter. A specific method of backwashing may include, to mention a few, a filtrate backwashing method in which filtrate, that is, water having been filtered, is allowed to flow in a direction counter to that during filtration, a bubble washing method in which air supplied to the untreated water is bubbled, and a gas backwashing method in which a gaseous medium is passed from the filtrate side towards the side of the untreated water to achieve backwashing. Of them, the gas backwashing method appears to be desirable since a spouting effect of the gaseous medium in combination of an effect of rubbing of the hollow fiber membranes under vibration is effective to efficiently remove the suspended particles. Such a backwashing if systematized to be automatically performed at intervals of a predetermined time is effective to facilitate maintenance and management of run of the system.

Where the hollow fiber membranes are made of a material having a high resistance to heat such as, for example, polysulfone, it is possible to restore the filtering performance by circulating, filtering or backwashing a hot water of a temperature equal to or higher than 60° C. at intervals of a predetermined time. Where the untreated water contains a relatively large quantity of organic suspended particles such as, for example, bacteria, and no use of any sterilizer is permitted, circulation of the hot water to achieve washing of the hollow fiber membranes is an effective means. Also, chemical washing generally practiced to wash hollow fiber membranes with the use of alkaline or acid may be employed.

In the practice of any one of the foregoing process steps B to D and F, the coagulating agent is of a kind effective to coagulate suspended particles to thereby change one or some of such properties of the suspended particles as sedimentability, floatability, buoyance and filterability. For this coagulating agent, an inorganic salt such as, for example, polychlorinated aluminum, aluminum sulfate band, ferric chloride, ferric sulfate or zinc chloride; an acid such as sulfuric acid, hydrochloric acid or carbon dioxide; an alkaline such as sodium carbonate, lime or sodium hydroxide; solid particles of, for example, electrolytic aluminum hydroxide, kaolin, bentonite or activated silica; or an organic polymer coagulant such as, for example, sodium polyacrylic acid, polyacrylamide, starch, gelatin, sodium alginate, salt of a copolymer of maleate or hydrochlorinated polyvinyl pyridine may be suitably employed. The specific coagulating agent and the amount thereof to be added may be suitably selected depending on the composition and the amount of the suspended particles in the untreated water, and the purpose and the application for which it is used. The specific type of a coagulating apparatus, a method of operating it and the operating condition (temperature, time, pH adjustment and so on) thereof may be those well known in the art. If the suspended particles are coagulated by the use of the coagulating agent, the suspended particles smaller in size than the particle cutoff of the hollow fiber membranes can be effectively coagulated to remove to thereby provide a clear purified water. Also, addition of the coagulating agent is effective to reduce the caking resistance of the suspended particles and, hence, as compared with the non-use of the coagulating agent, the addition of the coagulating agent is effective to increase the filtering speed considerably.

In the practice of any one of the process steps C and D, sedimentation is a process in which flocks coagulated by the use of the coagulating agent is sedimented and, therefore, the flocks can readily be collected for removal by separating the supernatant. On the other hand, floatation under pressure is a process in which fine air is used to float the coagulated flocks for separation and removal. By performing this pretreatment, the quantity of the suspended particles in the liquid medium to be introduced into the hollow fiber membranes can be reduced and, therefore, filtration can be performed stably and at a high filtering speed for a long period of time. Where the amount of the coagulating agent is required to be increased because of the presence of a large amount of the suspended particles, the employment of any one of the previously described process steps C and D is particularly advantageous.

With the practice of the process step D, if after the untreated water has been coagulated and the sedimentation or floatation under pressure has subsequently been subjected to the treated water, the treated water is filtered through a sand filter, a large quantity of the suspended particles can be removed. Such a treatment is used in, for example, production of service water. After the large amount of the suspended particles have been removed, the treated water may be filtered through the hollow fiber membranes each having the particle cutoff within the range of 1 to 10 $\mu$m. In such case, not only can in the quality of the resultant water be increased, but also, protozoa such as, for example, cryptosporidium and giardia, which cannot be completely filtered with the sand filter, can be effectively removed by the utilization with the sharp fractionating property of the hollow fiber membranes. Thus, not only can the safety factor be increased, but the water quality can also be stabilized in such a way as to minimize any possible change in quality of the water after the filtration.

Also, in the practice of any one of the foregoing process steps, the water may be treated with ozone, activated carbon or chlorine prior or subsequent to filtration through the hollow fiber membranes. Where it is required to decompose organic matter and/or to disinfect bacterium, treatment with ozone is sufficient, but where it is necessary to remove organic matter by adsorption, the use of activated carbon particles is recommendable. Where bacterium are required to be disinfected, it may be accomplished by the use of a chlorine disinfectant. By combining these treatments, not only can the purified water of an excellent quality be obtained, but the filtering speed can often increase. Some of methods of producing a purified water by the use of a combination of the treatments with ozone, activated carbon and chlorine will now be illustrated below.

a. Treatment with Ozone→Treatment with Activated Carbon→Filtration through Hollow fiber membranes→Disinfection with Chlorine b. Coagulation→Sedimentation→Sand Filtration→Treatment with Activated→Carbon Disinfection with Chlorine→Filtration through Hollow fiber membranes c. Coagulation→Sand Filtration→Filtration through Hollow fiber membranes→Disinfection with Chlorine As discussed above, in the practice of the conventional water purifying method, the particle cutoff of the standard hollow fiber membranes is not greater than 0.2 $\mu$m and most of the impurities contained in the untreated water are therefore rebuffed by the hollow fiber membranes. Accordingly, if the untreated water contains a relatively large amount of suspended particles, the suspended particles tends to deposit on a surface or inside of the separating membrane accompanied by reduction in flow rate. However, with any one of the pre-treatment processes according to the present invention, since the hollow fiber membranes each having the particle cutoff within the range of 1 to 10 $\mu$m are employed, any possible reduction in flow rate which would otherwise result from clogging can be suppressed considerably to secure and maintain a high filtering flow.

Other examples of use of the water purifying method utilizing the porous hollow fiber membranes of the present invention include, other than purification of service water, purification of water used in a pool, public baths, spa, an aquarium, tanks for aquatic animals, a coolant used in plants, boilers, ponds and so on to remove impurities contained therein. In the practice of the above described method, the hollow fiber membrane module utilizing the bundled porous hollow fiber membranes such as shown in FIG. 1 each having the particle cutoff within the range of 1 to 10 $\mu$m is employed.

The term "impounded water" herein used is intended to means a liquid medium such as, for example, water that is stored in a reservoir or a container for recirculation and that may be used for an intended purpose within the reservoir or the container or returned to the reservoir or the container after having been pumped in part by, for example, a pump out from the reservoir or the container for use for an intended purpose. The impounded water may include, for example, water for a swimming pool, water for public baths, water for spa, water for domestic bath, water for fish tanks in an aquarium, water for tanks for aquatic animals, water for artificial ponds, water for hot water circulation, water for cold water circulation, water for washing water circulation, water for process circulation, water for circulation in a boiler and so on.

In the practice of the method of the present invention, the amount of the impounded water may not be limited to a particular value, but in view of the fact that if the amount of the impounded water is great, the necessity of the amount of circulated purification is high, such effects of the circulated purifying in the method of the present invention as a high space saving, and a high cost-performance can easily be exhibited. The amount of the impounded water such as that in a swimming pool to which the method of the present invention is applied is preferably equal to or greater than 1 $m^3$.

Figure 6:
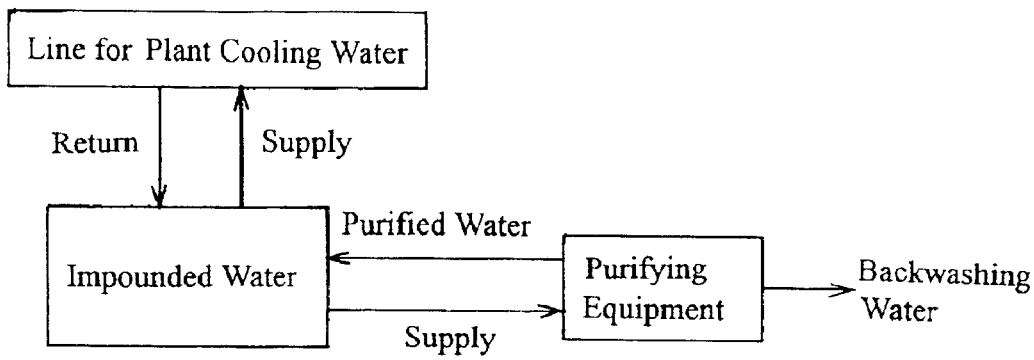
FIG. 6 is a flowchart showing the sequence of treatment showing one example of a circulated depurating method according to the present invention.
Figure 7:
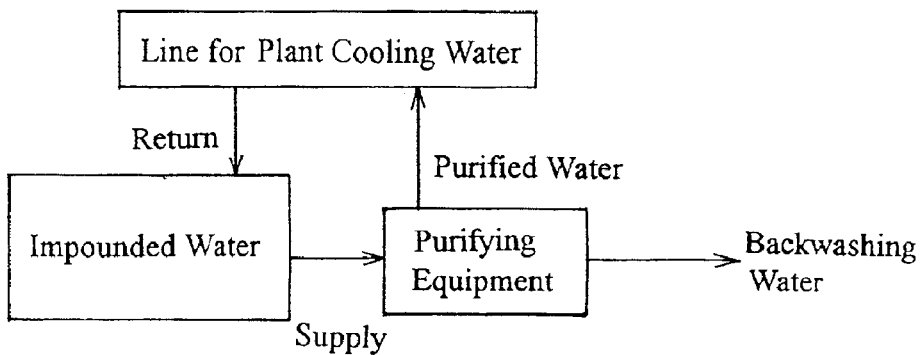
FIG. 7 is a flowchart showing the sequence of treatment showing one example of a circulated depurating method according to the present invention.
Figure 8:
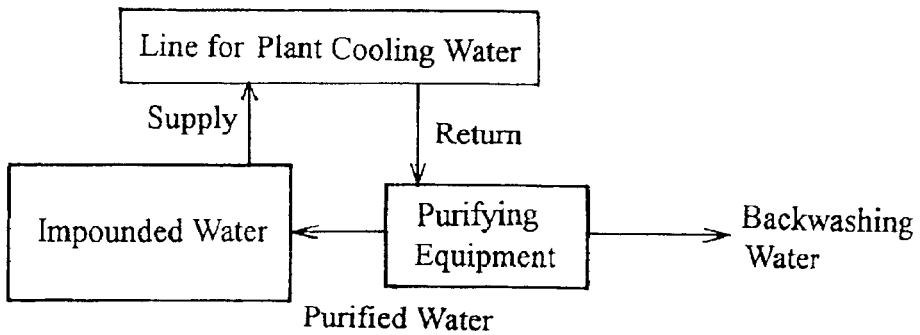
FIG. 8 is a flowchart showing the sequence of treatment showing one example of a circulated depurating method according to the present invention.

In the method of the present invention, portion of the impounded water is pumped either intermittently or continuously by the use of, for example, a pump and is then purified and the purified water is subsequently returned to the reservoir or the container. Some examples of the flow of the circulated purification according to the method of the present invention are shown in FIGS. 6 to 8. FIG. 6 illustrates a line for circulated purification of the impounded water installed independent of the line in which a cooled water is used for an intended purpose in a plant. Even where the impounded water is used for an intended purpose within the reservoir such as a swimming pool or an aquarium, the impounded water can be purified in a manner similar to that described above. FIG. 7 illustrates the example in which the impounded water is purified in a water supply line for use for an intended purpose, for example, as a cooling water in a plant. FIG. 8 illustrates the example, in which the impounded water is purified in a water return line through which the impounded water after having been used for an intended purpose, for example, as a cooling water in a plant is returned to the reservoir.

In the practice of the method of the present invention, a washing method similar to that described above is employed. In a case the hollow fiber membranes are prepared from a material having a high resistance to heat such as a polysulfone resin, the filtering performance can be recovered by performing a circulation washing, a backwashing or a filtration washing with the use of a hot or heated water of 60 to 99° C. at intervals of a predetermined time. Also, in the practice of the method of the present invention, the hollow fiber membranes can be washed at intervals of a predetermined time with the use of an oxidizing agent. The use of the oxidizing agent is particularly effective as a means for recovering the filtering performance of the hollow fiber membranes where the impounded water containing a relatively large amount of organic matters is desired to be purified. Examples of the oxidizing agent include, sodium hypochlorite, calcium hypochlorite, ozone, hydrogen peroxide and peracetic acid. The specific oxidizing agent and the concentration thereof to be used can be suitably selected depending on the condition of clogging occurring in the hollow fiber membrane and the specific material chosen for the hollow fiber membranes. Also, as a washing method in which the oxidizing agent is used, any of an immersion washing, a circulation washing, a filtration washing, and a backwashing in which the oxidizing agent is supplied from a filtrate side can be employed. In the method of the present invention, a chemical washing using alkaline or acid, or a detergent may be carried out.

In a manner similar to that described hereinbefore, some of methods of performing a circulation purification on the impounded water in combination with the treatments with ozone, activated carbon and chlorine will now be illustrated below.

a. Impounded Water→Treatment with Ozone→Treatment with Activated Carbon→Filtration through Hollow fiber membranes→Disinfection with Chlorine→Impounded Water b. Impounded Water→Coagulation→Filtration through Hollow fiber membranes→Treatment with Activated Carbon→Disinfection with Chlorine→Impounded Water c. Impounded Water→Disinfection with Chlorine→Filtration through Hollow fiber membranes→Impounded Water If the amount of the impounded water to be treated by circulation is increased relative to the amount of the impounded water, the quality of the impounded water may increase, but will require an increased cost for equipments. On the other hand, if the amount of the impounded water to be treated by circulation is reduced relative to the amount of the impounded water, the cost may decrease, but the quality of the impounded water will become worse. Accordingly, the amount of the impounded water to be treated by circulation may be suitably determined in dependence on the cost incurred by equipments, the capacity of the impounded water, the amount of the suspended particle contained in the impounded water, and/or the requirement for the quality. It is, however, to be noted that in the case of a swimming pool, the requirements have been stipulated by law that the treating capability for each day must be four times or more of the capacity of the pool.

As hereinabove described, in the method of the present invention, by using the hollow fiber membranes each having the particle cutoff within the range of 1 to 10 $\mu$m, which has a high pure water permeate flow and microparticles of a particle size smaller than 1 $\mu$m which tend to constitute a cause of clogging in the hollow fiber membranes penetrate through the membranes and, therefore, clogging can be suppressed to allow a high filtering speed to be achieved and maintained. Also, considering that most of the impounded water such as water for a swimming pool, water for public baths, water for spa, water for aquarium, water for tanks for aquatic animals, a cooling water used in a plant, boiler water, water for a pond may not always necessarily be purified to a level comparable with the level achieved by a microfiltration or ultrafiltration region and may be sufficient if the suspended microparticles of micron order are removed, the particle cutoff within the range of 1 to 10 $\mu$m should pose little problem in practice and is effective to secure and maintain an acceptable quality of water far more than that achieved by the sand filtration.

Hereinafter, the present invention will be demonstrated by way of examples which are taken only for the purpose of illustration and are not intended to limit the scope of the present invention.

EXAMPLE 1

A spinning dope 20 wt % of polysulfone (UDEL-P1800, manufactured by and available from AMOCO Japan, Ltd.

Hereinafter, this particular polysulfone is referred to as PSf.), 6 wt % of ethylene glycol (hereinafter referred to as EG), 18 wt % of silicon oxide having an average particle size of 4.5 µm, and 54 wt % of N, N-dimethyl acetamide (hereinafter referred to as DMAc) was prepared by the following procedure. Specifically, after EG has been dissolved into DMAc, the silica powder was uniformly dispersed in the DMAc solution by the use of a home jettor to provide a dispersed liquid which was subsequently added with PSf. The resultant mixture was then stirred for 8 hours at 60° C. to thereby dissolve the PSf, resulting in the white-colored slurry in which the silicon oxide was uniformly dispersed. This slurry was used as the spinning dope.

The spinning dope obtained in the manner described above was thereafter degassed. While the degassed spinning dope was maintained at 50° C, the degassed spinning dope was discharged from a nozzle of a double ring structure, 1.65 mm in outer diameter and 0.8 mm in inner diameter, at 50° C together with the coagulating liquid containing 80 wt % of N, N-dimethyl formamide (hereinafter referred to as DMF), 19 wt % of water and 1 wt % of polyvinyl alcohol (PVA 205, manufactured by and available from KURARAY CO., LTD. This particular polyvinyl alcohol is hereinafter referred to as PVA.). After this has been advanced 10 cm within a dry zone of a temperature of 50° C. and a relative humidity of 90%, this was introduced into water of 50° C. which formed a coagulating bath, to thereby provide hollow fiber membranes. The spinning speed was set to 4.5 m/min.

Subsequently, the resultant hollow fiber membranes were washed with hot water of 98° C. for two hours to extract DMAc, EG and PVA therefrom. Thereafter, the hollow fiber membranes were immersed for one hour in an aqueous solution heated to 60° C. and containing glutaraldehyde in a proportion of 3 g/L and sulfuric acid in a proportion of 30 g/L to cross-link the PVA. The hollow fiber membranes were then immersed for two hours in an aqueous solution heated to 80° C. and containing 13 wt % of sodium hydroxide to extract and remove silicon oxide contained therein. Also, the hollow fiber membranes were then washed for 2 hours with hot water of 90° C., followed by drying at 45° C. for 16 hours or more to thereby complete the hollow fiber membranes of 1.3 mm in outer diameter and 0.8 mm in inner diameter.

Figure 2:
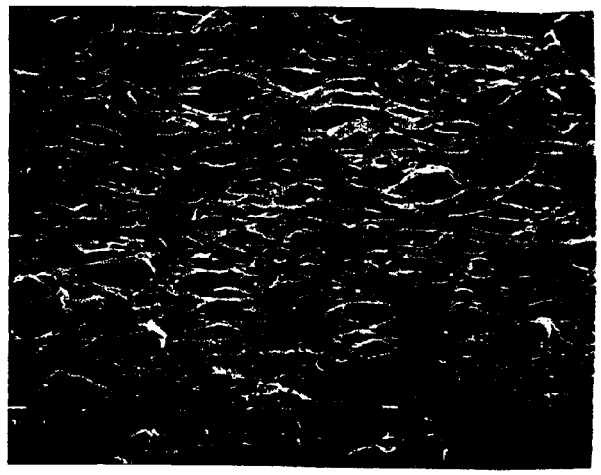
FIG. 2 is an electron micrograph taken at ×600, showing an outer surface of a hollow fiber membrane according to the present invention.
Figure 3:
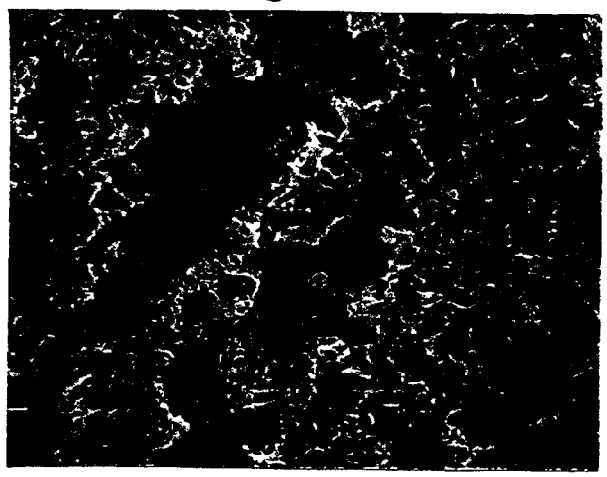
FIG. 3 is an electron micrograph taken at ×600, showing an inner surface of the hollow fiber membrane according to the present invention.
Figure 4:
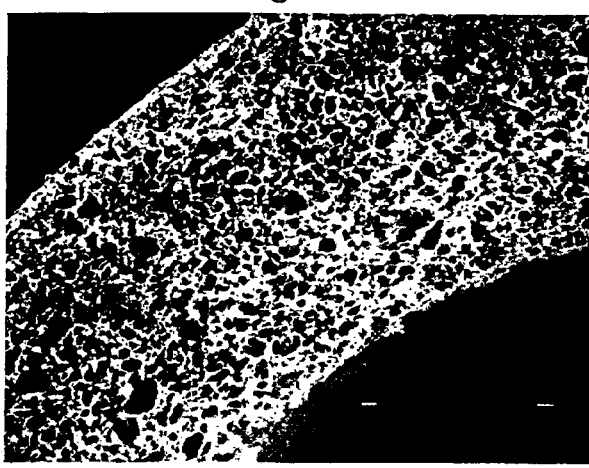
FIG. 4 is an electron micrograph taken at ×250, showing a transverse section of the hollow fiber membrane according to the present invention.

The resultant hollow fiber membranes were found to have a pure water permeate flow of 135,000 L/m$^2$/hr/100 kPa and a particle cutoff of 2.4 µm. Electron microphotographs showing an outer surface, an inner surface and a section of the resultant hollow fiber membranes are shown in FIGS. 2, 3 and 4, respectively.

EXAMPLE 2

In a manner similar to that in Example 1, except that the use was made of the spinning dope containing 20 wt % of PSf, 6 wt % of EG, 20 wt % of silicon oxide having an average particle size of 11 µm, 2 wt % of silicon oxide having an average particle size of 4.5 µm and 52 wt % of DMAc, the hollow fiber membranes were manufactured. The resultant hollow fiber membranes were found to have a pure water permeate flow of 520,000 L/m$^2$/hr/100 kPa and a particle cutoff of 5.0 µm.

EXAMPLE 3

In a manner similar to that in Example 1, except that the use was made of the spinning dope containing 20 wt % of PSf, 4 wt % of EG, 14 wt % of silicon oxide having an average particle size of 1.5 µm, and 62 wt % of DMF, the hollow fiber membranes were manufactured. The resultant hollow fiber membranes were found to have a pure water permeate flow of 39,000 L/m$^2$/hr/100 kPa and a particle cutoff of 1.2 µm.

EXAMPLE 4

Using the hollow fiber membranes manufactured in Example 1, a single-open ended module having an effective length of 50 cm (with effective membrane area of 3.5 m$^2$) was assembled. Using this module, a filtering test was conducted in such a way as to filter an untreated water, which was a river water which had been coagulated, sedimented, sand-filtered and chlorinated, according an extra-pressurized complement filtering system under operating conditions as tabulated in Table 1. The filtering speed was 24 m$^3$/m$^2$/d which was ten times or higher than the filtering speed for the standard separation membrane. For comparison purpose, using the hollow fiber membranes similar to in Example 1 except having a particle cutoff of 0.1 µm and a pure water permeate flow of 2,400 L/m$^2$hr/100 kPa, a similar filtering test was conducted to study transition of the intermembrane pressure differential. Results of these filtering tests are shown in FIG. 5.

TABLE 1

| | Particle Cutoff | Filtering Flow | Filtered for | Backwashing Method | Backwashing Time |
|---|---|---|---|---|---|
| Separation Membrane in Exm. 4 | 2.4 µm | 24 m$^3$/m$^2$/d | 30 min. | Backwashing with Air (0.2 MPa) | 1 min. |
| Separation Membrane In Comp. | 0.1 µm | 24 m$^3$/m$^2$/d | 30 min. | Backwashing with Filtrate (0.2 MPa) | 1 min. |

Figure 5:
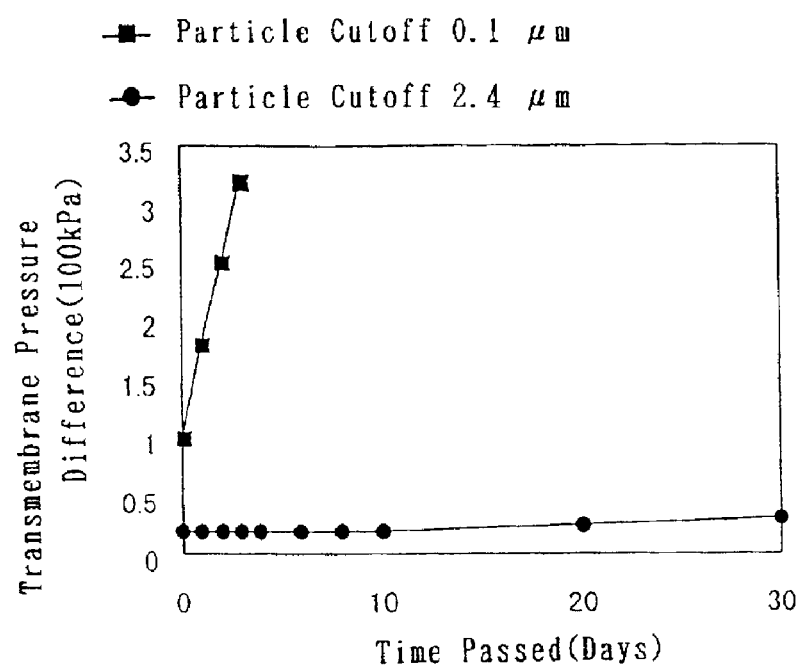
FIG. 5 is a characteristic graph showing results of filtering tests conducted on Example 4 of the present invention and a comparison.

As shown in FIG. 5, with the separation membrane having a particle cutoff of 0.1 µm, increase of the intermembrane pressure differential (reduction in flow rate) occurred in about three days. In contrast thereto, with the hollow fiber membranes having a particle cutoff of 2.4 µm, no increase in intermembrane pressure differential was barely observed even after about 1 months and it has been found that an extremely stable filtration could be carried out.

EXAMPLES 5 to 9

Using the hollow fiber membranes manufactured in a manner similar to that in Example 1, surface water of a river having a turbidity of 15 to 29 degrees was used as an untreated water and was treated under the following conditions. Tests were conducted to measure the filtering speeds at which increase of the pressure differential can transit at a rate equal to or lower than 0.01 MPa when the untreated water had been treated continuously for a week. Respective results of the tests are shown in Table 2. Although the filtering flow exhibited by the hollow fiber membranes differs depending on the method of treatment, the quality of the filtered water could be obtained stably.

Example 5: Untreated Water→Filtration through Hollow fiber membranes.

Example 6: Untreated Water→Coagulation→Filtration through Hollow fiber membranes.

Example 7: Untreated Water→Coagulation→Sedimentation→Filtration through Hollow fiber membranes.

Example 8: Untreated Water→Coagulation→Sedimentation→Rapid Sand Filtration→Filtration through Hollow fiber membranes.

Example 9: Untreated Water→Coagulation→Rapid Sand Filtration→Filtration through Hollow fiber membranes.

TABLE 2

| Separation Membrane | Average Turbidity of Untreated Water |
|---|---|
| Filtering Flow (m$^3$/m$^2$/d) | |
| Exm. 5  8 | 0.2 |
| Exm. 6  20 | 0.1 |
| Exm. 7  24 | 0.1 |
| Exm. 8  36 | 0.1 |
| Exm. 9  36 | 0.1 |

EXAMPLE 10

Figure 9:
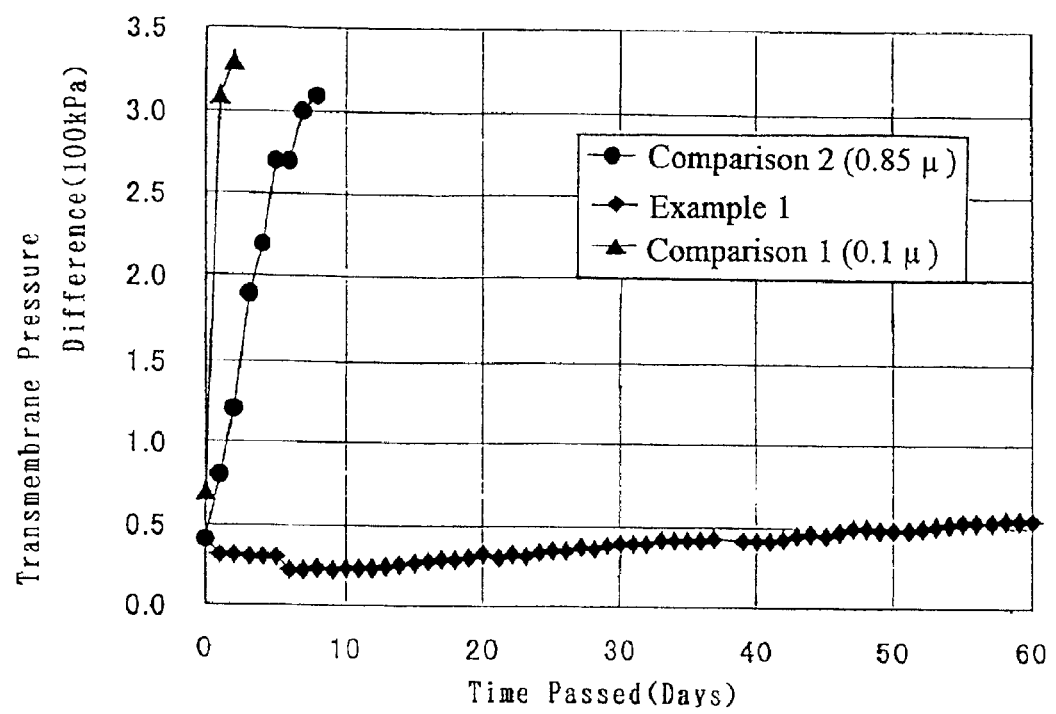
FIG. 9 is a characteristic graph showing results of filtering tests conducted on Example 10 of the present invention and Comparisons 1 and 2.

Using the hollow filter manufactured in a manner similar to that in Example 1, and using 19 single-open ended modules each having an effective length of 97 cm (with effective membrane area of 7 m$^2$), water of a heated swimming pool having an impoundment of 360 m$^3$ was purified by circulation according to the following flows under the following operating conditions. Results of the tests are shown in FIG. 9.

Treatment Flow

Pool→Injection of sodium hypochlorite (0.6 mg/L)→Prefiltration (Particle cutoff: 100 μm)→Filtration through Hollow fiber membranes→Pool.

Operating Conditions

| Filtering System: | Extra-pressurized Complement Filtering System (Constant Flow Filtration) Filtering Flow: 100 m$^3$/hr (750 L/(m$^2$ · hr)) |
|---|---|
| Backwashing: | Backwashing with Air (Backwashing Pressure: 0.17 MPa) Backwashing Time: 30 seconds Backwashing Cycle: At intervals of 15 minutes (However, Backwash drainage was at intervals of 3 hours.) |

Comparisons 1 and 2

As for Comparison 1, the hollow fiber membranes were prepared by the use of, as a membrane material (content of PVA: 2 wt %), polysulfone which had been treated with PVA to impart a hydrophilic property thereto. The resultant hollow fiber membranes were 1.0 mm in outer diameter and 0.6 mm in inner diameter and had a particle cutoff of 0.1 μm and a pure water permeate flow of 2,400 L/m$^2$/hr/100 kPa.

On the other hand, as for Comparison 2, the hollow fiber membranes were prepared by the use of, as a membrane material (content of PVA: 2 wt %), polysulfone which had been treated with PVA to impart a hydrophilic property thereto. The resultant hollow fiber membranes were 1.3 mm in outer diameter and 0.8 mm in inner diameter and had a particle cutoff of 0.85 μm and a pure water permeate flow of 22,000 L/m$^2$/hr/100 kPa.

The hollow fiber membranes according to these Comparisons 1 and 2 were tested in a manner similar to that in Example 10 to purify the pool water by circulation according to the flows under the operating conditions as set forth in Example 10. It is, however, to be noted that since the hollow fiber membranes according to Comparison 1 cannot be backwashed with air, the filtrate backwashing and the bubbling backwashing were used in combination to backwash the hollow fiber membranes according to Comparison 1.

Results of the tests are shown in FIG. 9.

As shown in FIG. 9, while increase of the pressure differential resulting from clogging occurred in the hollow fiber membranes in Comparisons 1 and 2 in one to seven days subsequent to the start of the purification by circulation, no increase of the pressure differential occurred in the hollow fiber membranes in Example 10 even two months subsequent to the start of the purification by circulation and, thus, the pool water could be treated stably.

Using the pool water, FI (Fouling Index) of the water filtered by the hollow fiber membranes used in Example 10 was measured. For comparison, the FI of the water filtered through filtration with a filter aid using a filtering material having a pre-coated layer of diatomite (RADIOLITE (trade mark) #600, manufactured by and available from SHOWA CHEMICAL INDUSTRY CO., LTD.). Results of measurement are shown in Table 3 below. The FI value of the filtrate from the hollow fiber membranes used in Example 10 was found to be lower than that of the filtrate from the filtration with a filter aid, indicating that the water quality of the filtrate from the hollow fiber membranes in Example 10 was excellent.

TABLE 3

| Method | FI of Pool Water | FI of Filtrate |
|---|---|---|
| Filtration through Hollow Fiber Membranes | 6.3 | 3.5 |
| Filtration with a filter aid | | 4.1 |

EXAMPLE 11

Using as a membrane material (content of PVA: 2 wt %) polysulfone which had been treated with PVA to impart a hydrophilic property thereto, using hollow fiber membranes of 1.3 mm in outer diameter and 0.8 mm in inner diameter and having a particle cutoff of 3.8 μm and a aquapura permeating speed of 320,000 L/m$^2$/hr/100 kPa, and using a single-open ended module having an effective length of 20 cm (with effective membrane area of 1 m$^2$), a coolant water used in a cooling tower (Impoundment: 8 m$^3$) was purified by circulation according to the method shown in FIG. 6 under the following operating conditions.

Filtering System: Extra-pressurized Complement Filtering System (Constant Flow Filtration) Filtering Flow 1 m$^3$/hr (750 L/(m$^2$ hr))

Backwashing: Backwashing with Air (Backwashing Pressure: 0.17 MPa) Backwashing Time: 30 seconds Backwashing Cycle: At intervals of 30 minutes Supplemented Water: Industrial Water (Turbidity: 2 to 5 degrees)

Data on the intermembrane pressure differential and the quality of the treated water at the initial time and one month after the start of the continuous treatment are shown in Table 4 below.

TABLE 4

| Days Passed | Pres. Differential (100 kPa) | Turbidity (degree) | Treatment Flow (m$^3$/m$^2$/d) |
|---|---|---|---|
| Initial | 0.10 | 3.5 | 1.0 |
| 7 | 0.17 | 1.3 | 1.0 |
| 20 | 0.19 | <1 | 1.0 |
| 30 | 0.20 | <1 | 1.0 |

EXAMPLE 12 and Comparison 3

Using the hollow fiber membranes manufactured in Example 1, a single-open ended module having an effective length of 30 cm (with effective membrane area of 1.8 m²) was assembled. The hollow fiber membrane module used in Example 12 has the filtered water discharge port 13 positioned downwards as shown in FIG. 1, but the hollow fiber membrane module used in Comparison 3 has the filtered water discharge port 13 positioned upwards. These hollow fiber membrane modules were tested under the following conditions as to the filtering capacity using 500 mg/L of kaolin as an untreated water and a closed fluid circuit in which filtrate and backwashing water are returned to an untreated water tank.

| | |
|---|---|
| Untreated Water: | 500 mg/L of kaolin |
| Filtering Flow: | 1 m³/m²/hr |
| Backwashing Cycle: | At intervals of 30 minutes |
| Backwashing Method: | Backwashing with Air (Air Pressure: 1 kg/cm²) |
| Backwashing Time: | 10 seconds |

After the hollow fiber membrane modules had been tested continuously for a week, the hollow fiber membranes were removed out of the closed fluid circuits and conditions of deposit of suspended particles were examined. As a result, a relatively large amount of the suspended particles were deposited in the vicinity of the bonding resin block in the hollow fiber membrane module used in Comparison 3, whereas no suspended particle was almost deposited in the hollow fiber membrane module used in Example 12.

The present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A porous hollow fiber membrane obtained by dry-wet spinning method or a wet spinning method from a spinning dope while using the following components:
    a spinning dope containing a base polymer as a material for forming said porous hollow fiber membrane,
    an additive for facilitating a phase separation of said spinning dope,
    a solvent compatible with both, said base polymer and said additive, and a mass of microparticles insoluble in said solvent, wherein said microparticles are uniformly dispersed in a liquid medium and have an average particle size within the range of 1 to 20 $\mu$m,
    wherein an amount of the additive and/or the particle size is adjusted to enhance the coagulation action of the microparticles; and
    a coagulating liquid for forming the hollow fiber membrane, to obtain a spun hollow fiber membrane, and extracting said additive with cold water or water at a temperature from 40 to 90 degree C.; and
    extracting and removing said micropartilces by immersing said spun hollow fiber membrane into an extracting solution effective to dissolve said microparticles, but ineffective to dissolve said base polymer;
    wherein said hollow fiber membrane has a permselectivity; and wherein a particle weight cutoff is within the range of 1 to 10 um; and a pure water permeate flow is equal to or higher than 30,000 L/M2/100 kpa.

2. The porous hollow fiber membrane as claimed in claim 1, wherein said particle cutoff is within the range of 2 to 5 $\mu$m and said pure water permeate flow is equal to or higher than 100,000 L/m²/hr/100 kPa.

3. The porous hollow fiber membrane as claimed in claim 1, wherein said porous hollow fiber membrane comprises a polysulfone material.

4. The porous hollow fiber membrane as claimed in claim 3, wherein said porous hollow fiber membrane comprises a polysulfone material comprising 1 to 10 wt % of a hydrophilic polymer.

5. The porous hollow fiber membrane as claimed in claim 4, wherein the hydrophilic polymer is a polyvinylalcohol polymer.

6. a method of making a porous hollow fiber membrane comprising:
    forming said hollow fiber membrane according to a dry-wet spinning method or a wet spinning method while using the following components:
    a spinning dope containing a base polymer as material forming said porous hollow fiber membrane,
    an additive for facilitating a phase separation of said spinning dope,
    a solvent compatible with both, said base polymer and said additive, and a mass of micropartilces insoluble in said solvent, wherein said microparticles are uniformly dispersed in a liquid medium and have an average particle size within the range of 1 to 20 um;
    wherein an amount of the additive and/or the particle size is adjusted to enhance the coagulation action of the microparticles; and
    a coagulation liquid for forming the hollow fiber membrane, to obtain a spun hollow fiber membrane, and extracting said additive with cold water or water at a temperature from 40 to 90 degree C.; and
    extracting said microparticles by immersing said spun hollow fiber membrane into an extracting solution effective to dissolve said microparticles but ineffective to dissolve sad base polymer;
    wherein said hollow fiber membrane has a permeability; and wherein a particle cutoff is within the range of 1 to 10 um; and a pure water permeate flow is equal to or higher than 30,000 L/m2/hr/100 kpa.

7. The method of making the porous hollow fiber membrane as claimed in claim 6, wherein the spinning dope is used in the form of a uniform spinning dope of a composition in which when only the base polymer, the additive and the solvent compatible to both the base polymer and the additive are dissolved, phase separation takes place, but addition of the microparticles suppresses the phase separation to enable spinning of the hollow fiber membrane.

8. The method of making the porous hollow fiber membrane as claimed in claim 6, wherein said microparticles comprise silicon oxide.

9. The method of making the porous hollow fiber membrane as claimed in claim 6, wherein said coagulating liquid for forming the hollow fiber membrane is a solution comprising 1 to 10 wt % of a polyvinyl alcohol.

10. A porous hollow fiber membrane module which comprises:
    a plurality of porous hallow fiber membranes as claimed in claim 1, each of the porous hollow fiber membranes having an effective length not greater than 50 cm, each or a block of the porous hollow fiber membranes being sealed at one end thereof;

a housing;

a protective casing; and a bonding resin block accommodated within the housing and positioned at a lower end region of the housing while an end sealing region is positioned in an upper region of the housing when the module is in use.

11. A method of using porous the hollow fiber membrane as claimed in claim 1 for preparing a purified water, comprising:

filtering an untreated water from a water source through said porous hollow fiber membrane.

12. A method of using the porous hollow fiber membrane module as claimed in claim 10 for preparing a purified water, comprising:

filtering an untreated water from a water source through said porous hollow fiber membrane module.

13. A method of using the porous hollow fiber membrane as claimed in claim 1 for preparing a purified water, comprising:

coagulating an untreated water from a water source with a coagulating agent; and subsequently filtering the water through said porous hollow fiber membrane.

14. A method of using the porous hollow fiber membrane module as claimed in claim 10 for preparing a purified water, comprising:

coagulating an untreated water from a water source with a coagulating agent; and subsequently filtering the water through said porous hollow fiber membrane module.

15. A method of using the porous hollow fiber membrane as claimed in claim 1 for preparing a purified water, comprising:

coagulating an untreated water from a water source with a coagulating agent;

subsequently subjecting the water to a sedimentation or a pressurized floatation treatment to separate suspended particles from the water; and filtering the water, from which the suspended particles have been separated, through said porous hollow fiber membrane.

16. A method of using the porous hollow fiber membrane module as claimed in claim 10 for preparing a purified water, comprising:

coagulating an untreated water from a water source with a coagulating agent;

subsequently subjecting the water to a sedimentation or a pressurized floatation treatment to separate suspended particles from the water; and filtering the water, from which the suspended particles have been separated, through said porous hollow fiber membrane module.

17. A method of using porous hollow fiber membrane as claimed in claim 1 for preparing a purified water, comprising:

coagulating an untreated water from a water source with a coagulating agent;

subsequently subjecting the water to a sedimentation or a pressurized floatation treatment to separate suspended particles from the water;

filtering the water, from which the suspended particles have been separated, through a sand filter, to obtain a sand-filtered water; and filtering the sand-filtered water through the porous hollow fiber membrane.

18. A method of using the porous hollow fiber membrane module as claimed in claim 10 for preparing a purified water, comprising:

coagulating an untreated water from a water source with a coagulating agent;

subsequently subjecting the water to a sedimentation or a pressurized floatation treatment to separate suspended particles from the water;

filtering the water, from which the suspended particles have been separated, through a sand filter, to obtain a sand-filtered water; and filtering the sand-filtered water through the porous hollow fiber membrane module.

19. A method of using porous hollow fiber membrane as claimed in claim 1 for preparing a purified water, comprising:

filtering an untreated water from a water source through a sand filter to obtain a sand-filtered water; and subsequently filtering the sand-filtered water through the porous hollow fiber membrane.

20. A method of using the porous hollow fiber membrane module as claimed in claim 10 for preparing a purified water, comprising:

filtering an untreated water from a water source through a sand filter to obtain a sand-filtered water; and subsequently filtering the sand-filtered water through the porous hollow fiber membrane module.

21. A method of using porous hollow fiber membrane as claimed in claim 1 for preparing a purified water, comprising:

coagulating an untreated water from a water source;

subsequently filtering the treated water through a sand filter to obtain a sand-filtered water; and filtering the sand-filtered water through the porous hollow fiber membrane.

22. A method of using the porous hollow fiber membrane module as claimed in claim 10 for preparing a purified water, comprising:

coagulating an untreated water from a water source;

subsequently filtering the treated water through a sand filter to obtain a sand-filtered water; and filtering the sand-filtered water through the porous hollow fiber membrane module.

23. A method of using the porous hollow fiber membranes as claimed in claim 1 for preparing a purified water, comprising:

subjecting the water to at least one treatment selected from the group consisting of ozone treatment, activated carbon treatment and chlorine treatment, either before or after the filtration through the porous hollow fiber membrane.

24. A method of using the porous hollow fiber membrane module as claimed in claim 10 for preparing a purified water, comprising:

subjecting the water to at least one treatment selected from the group consisting of ozone treatment, activated carbon treatment and chlorine treatment, either before or after the filtration through the porous hollow fiber membrane module.

25. The method of using the porous hollow fiber membrane as claimed in claim 11, wherein the purified water is prepared by backwashing separation membranes at intervals of a predetermined time using a gaseous medium.

26. The method of using a porous hollow fiber membrane module as claimed in claim 12, wherein the purified water is prepared by backwashing separation membranes at intervals of a predetermined time using a gaseous medium.

27. The method of using porous hollow fiber membrane as claimed in claim 11, wherein the purified water is prepared by backwashing separation membranes at intervals of a predetermined time using a hot water of a temperature not lower than 60° C.

28. The method of using a porous hollow fiber membrane module as claimed in claim 12, wherein the purified water is prepared by backwashing separation membranes at intervals of a predetermined time using a hot water of a temperature not lower than 60° C.

29. The porous hollow fiber membrane according to claim 1 having pores in the shape of circle or ellipse.

30. The porous hollow fiber membrane according to claim 1 having a mesh structure, a honeycomb structure or a micro-interstice structure.

31. The porous hollow fiber membrane according to claim 1, wherein said additive is ethylene glycol.

32. The method according to claim 6, wherein said additive is ethylene glycol.

* * * * *